3,262,932
TERT-BUTYL 7-AMINOCEPHALOSPORANATE
Robert John Stedman, Paoli, Pa., assignor to Smith Kline & French Laboratories, Philadelphia, Pa., a corporation of Pennsylvania
No Drawing. Filed June 7, 1965, Ser. No. 462,096
1 Claim. (Cl. 260—243)

This invention relates to the tert-butyl ester of 7-aminocephalosporanic acid, useful as an intermediate for the preparation of cephalosporin antibiotics.

The ester of the present invention is represented by the following structural formula:

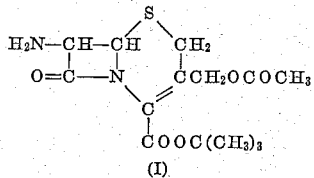

(I)

Cephalosporins have become increasingly prominent in the field of antibiotic research due to the activity they frequently exhibit against both Gram-positive and Gram-negative bacteria. Chemical syntheses in this area are often difficult because of the complexity of the cephalosporin nucleus. In particular, the carboxy group interferes with certain chemical reactions of cephalosporins. Protection of the carboxy group by esterification with such lower alcohols as methanol, ethanol, or propanol requires the use of such vigorous conditions for the regeneration of the carboxy group that these esters are not desirable as intermediates for cephalosporin synthesis. Such reaction conditions are primarily undesirable from the standpoint of the integrity of the cephalosporin nucleus and the yield of product.

The compound of the present invention, tert-butyl 7-aminocephalosporanate, may be acted upon by chemical and biological reagents as described below to form tert-butyl esters of 7-acylated cephalosporin compounds, and these esters then cleaved under extremely mild conditions to yield the cephalosporin antibiotic. This inventive ester thus constitutes an especially suitable intermediate for the preparation of cephalosporin antibiotics, this intermediate having its carboxy group protected by an unusual group readily eliminated under mild conditions.

The amino group of tert-butyl 7-aminocephalosporanate may be acylated with a variety of carboxylic acids under the condensing influence of carbodiimide or similar reagents. Examples of such acylating acids are phenylacetic acid, phenoxyacetic acid, naphthylacetic acid, dimethoxyphenylacetic acid, thienylacetic acid, pyridylacetic acid, and those acids corresponding to other well-known cephalosporin or penicillin side chains. Use of the tert-butyl ester rather than the free carboxylic acid eliminates the possibility of the amino group of 7-aminocephalosporanic acid (7-ACA) condensing with its own carboxyl group.

The acetoxy group of 7-ACA may be hydrolyzed enzymatically to give a hydroxymethyl compound which may then be selectively O-acylated and then N-acylated to give various cephalosporin analogs. A free carboxy group can react with the hydroxy group to form a lactone, thus preventing the acylation of the hydroxy group. The tert-butyl ester of 7-ACA is thus also useful for this series of reactions.

The tert-butyl ester of 7-aminocephalosporanic acid is prepared by treatment of 7-ACA with isobutylene in the presence of an acid catalyst such as sulfuric acid. The reaction is carried out at 25–35° in a sealed pressure bottle in an inert solvent, preferably an ether such as dioxane or tetrahydrofuran.

The ester group is cleaved to the corresponding acid with trifluoroacetic acid at room temperature, preferably in the absence of a solvent.

Example 1

To 100 ml. of dry dioxane, which has been freed of peroxides by passage through a column of activated alumina, is cautiously added 10 ml. of conc. sulfuric acid. The mixture is placed in a pressure bottle, cooled in ice, and 10.88 g. (0.04 mole) of 7-aminocephalosporanic acid and 50 ml. of liquid isobutylene are added. The bottle is sealed, and the mixture stirred at 28–30° for 2 hours. The bottle is then cooled in ice and the contents poured into a stirred, ice-cold mixture of 40 g. of sodium bicarbonate, 500 ml. of water, and 250 ml. of ethyl acetate. The aqueous phase is re-extracted with an additional 250 ml. of ethyl acetate, and the combined extracts are evaporated in vacuo at 35° to an oil which readily crystallizes. Trituration with 50 ml. of cyclohexene yields tert-butyl 7-aminocephalosporanate, M.P. 109–11° (d.). The ester is recrystallized without heating from methanol-isopropanol to give colorless plates, M.P. 114–115° (d.).

Example 2

Tert-butyl 7-aminocephalosporanate (500 mg., 1.52 mmoles) is dissolved in 10 ml. of ice-cold trifluoroacetic acid and maintained at room temperature for 30 minutes. The trifluoroacetic acid is evaporated under reduced pressure without heating, and the oily residue is dissolved in 10 ml. of water, cooled in ice, and brought to pH 4 with 1 N sodium hydroxide to precipitate 7-ACA.

I claim:
The compound of the structure

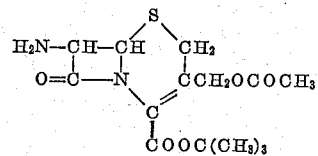

No references cited.

ALEX MAZEL, *Primary Examiner.*
JAMES W. ADAMS, JR., *Assistant Examiner.*